United States Patent
Akino

(10) Patent No.: US 7,330,559 B2
(45) Date of Patent: Feb. 12, 2008

(54) MICROPHONE

(75) Inventor: Hiroshi Akino, Machida (JP)

(73) Assignee: Kabushiki Kaisha Audio-Technica, Machida-Shi, Tokyo (JP)

( * ) Notice: Subject to any disclaimer, the term of this patent is extended or adjusted under 35 U.S.C. 154(b) by 615 days.

(21) Appl. No.: 11/034,830

(22) Filed: Jan. 14, 2005

(65) Prior Publication Data

US 2005/0157902 A1    Jul. 21, 2005

(30) Foreign Application Priority Data

Jan. 16, 2004   (JP) ............................. 2004-008863

(51) Int. Cl.
*H04R 25/00* (2006.01)
(52) U.S. Cl. ................. 381/363; 381/361; 381/362
(58) Field of Classification Search ................. 381/361, 381/362, 363, 365, 366, 355, 368, 122, 375; 248/121
See application file for complete search history.

(56) References Cited

U.S. PATENT DOCUMENTS 3,324,254 A * 6/1967 Shaw et al. ................. 381/363
6,590,989 B2 * 7/2003 Chen .......................... 381/363

* cited by examiner

*Primary Examiner*—Huyen Le
(74) *Attorney, Agent, or Firm*—Manabu Kanesaka

(57) ABSTRACT

In a gooseneck microphone device in which a microphone unit is supported by a column partially including a flexible pipe, the conductive resistance in a connecting portion of the flexible pipe is low, so that stable continuity can be secured for a long period of time, and vibrations are damped in the connecting portion of the flexible pipe. In connecting an end portion 21a of the flexible pipe 21 to a support pipe 22 via a connector 31, a spacer 40 (for example, a metallic mesh sheet 41) formed of a metallic material having electric conductivity and spring-like elastic restoring force is interposed in the connecting portion, and the flexible pipe and the connector are bonded to each other by an elastic adhesive which has elasticity even after being cured.

5 Claims, 2 Drawing Sheets

MICROPHONE

TECHNICAL FIELD

The present invention relates to a microphone device installed on a table, for example, in a conference hall. More particularly, it relates to a gooseneck microphone device in which a microphone unit is supported by a column partially including a flexible pipe.

BACKGROUND ART

Microphone devices are used properly according to their applications such as for music, conference, video camera, and the like. As one of the microphone devices used in a conference hall etc., a gooseneck microphone device has generally been used. FIG. 4 shows one example thereof.

According to this example, for the gooseneck microphone device, a microphone unit 10 is installed on a table via a column 20 including a flexible pipe 21 and a metallic support pipe 22, so that the microphone unit 10 can be adjusted to a proper position with respect to a sound source (speaker) by the flexibility of the flexible pipe 21.

In this example, the microphone unit 10 is held at the distal end of the support pipe 22, and the flexible pipe 21 is interposed between the support pipe 22 and a rotating pedestal 23 supported rotatably on a base, not shown, fixed on a table. For some gooseneck microphone units, the flexible pipe 21 and the support pipe 22 are replaced with each other in arrangement; specifically, the microphone unit 10 is held at the distal end of the flexible pipe 21, and the support pipe 22 is interposed between the flexible pipe 21 and the rotating pedestal 23.

Also, as described in Patent Document 1 (Japanese Utility Model Application Publication No. H05-97191), there has been disclosed a gooseneck microphone device in which the flexible pipe 21 is connected to both ends of the support pipe 22. Further, for some gooseneck microphone devices, the lower end of the flexible pipe 21 or the support pipe 22 is inserted in and fixed to the base without the use of the rotating pedestal 23.

As is well known, the flexible pipe 21 is manufactured by forming a coil spring for generating a restoring force by a round wire such as a steel wire and by inserting a triangular wire consisting of a copper alloy, which has a triangular cross section and is plastically deformed, in a gap between the coil springs. According to this configuration, since the round wire and the triangular wire have high friction, the flexible pipe 21 can be deformed to an arbitrary position, and the deformed state is self-held.

The flexible pipe 21 is cut to a length in accordance with the design drawing, and is connected to the support pipe 22 via a sleeve-form connector 31. Also, the rotating pedestal 23 is provided with a connector (socket) 32 for connecting the flexible pipe 21 to the rotating pedestal 23 by inserting the end portion of the flexible pipe 21 therein.

When the flexible pipe 21 is cut, the coil comes unwound and the end portion thereof spreads out. The amount of spreading is proportional to the amount of unwinding, and the amount of unwinding is not fixed, so that the connectors 31 and 32 are designed so that the inside diameters thereof are large with a margin.

Therefore, when the end portion of the flexible pipe 21 is inserted into the connectors 31 and 32, a wide gap is produced, so that it is necessary to connect the flexible pipe 21 electrically and mechanically to the support pipe 22 and the rotating pedestal 23 by filling this gap.

Specifically, since an electrical cable, not shown, connected to the microphone unit 10 is inserted into the column 20, unless the whole of the column 20 is shielded, noise from the outside may intrude into the electrical cable due to electrostatic connection.

Especially in the case of a condenser microphone, a signal line that is unbalanced with a power line is inserted as the electrical cable. Therefore, unless the whole of the column 20 is shielded, noise may be generated by the intrusion of electromagnetic waves.

Conventionally, therefore, a conductive adhesive has been packed between the end portions of the flexible pipe 21 and the connectors 31 and 32 to secure electrical connection, and besides, for example, an epoxy adhesive has been used to provide mechanical connection strength.

However, since metal powder such as silver is incorporated in the conductive adhesive, displacement after curing changes the electrical resistance, and thereby noise may be generated. Also, the conductive adhesive has a property that the cured adhesive is very hard and brittle to shock.

To compensate this brittleness, the epoxy adhesive having a high bonding strength is used as described above. However, because of high bonding strength, the epoxy adhesive has a problem as described below. When the microphone device is used by being installed on a table, vibrations applied to the table is easily propagated to the microphone unit 10 via the column 20. The vibration noise increases because the mechanical connection becomes tighter as the connecting portion between the flexible pipe 21 and the connectors 31 and 32 is strengthened.

SUMMARY OF THE INVENTION

To solve the above problems, the present invention provides a gooseneck microphone device in which in a gooseneck microphone device, a column a part of which connects with a flexible pipe via a connector and the whole of which has a continuity and a microphone unit installed at the distal end of the column are included; the microphone unit is supported on an installation stand such as a table via the column; and an electrical cable connected to the microphone unit is inserted into the column, wherein an end portion of the flexible pipe is fitted in the connector via a spacer formed of a metallic material having electric conductivity and spring-like elastic restoring force, and the flexible pipe and the connector are bonded to each other by an elastic adhesive which has elasticity even after being cured.

According to this configuration, the flexible pipe and the connector are connected electrically to each other via the spacer formed of a metallic material having electric conductivity and spring-like elastic restoring force. Since a conductive adhesive is not used, the conductive resistance is low, so that stable continuity can be secured for a long period of time.

In the present invention, the spacer preferably consists of a mesh sheet made of a metallic wire. More preferably, the mesh sheet made of the metallic wire is formed into a cylindrical shape arranged along the outer periphery of the end portion of the flexible pipe. Further, the mesh sheet made of the metallic wire, which is formed into the cylindrical shape, is preferably provided with irregularities.

Since the elastic adhesive which has elasticity even after being cured is used as mechanical connecting means for connecting the connector to the flexible pipe, a shock mount effect for the microphone unit is achieved in the connecting portion, by which vibration noise can be reduced.

A mode in which the spacer is formed of a plate spring material, and includes a cylindrical cap portion which is fitted on the outer periphery of the end portion of the flexible pipe and a contact segment which is connectingly provided on one end side of the cap portion so as to come into contact elastically with the inside surface of the connector is also embraced in the present invention.

Since the mesh sheet made of the metallic wire is used as the spacer, a gap between the flexible pipe and the connector can be filled easily, and since the adhesive intrudes into the mesh sheet, the bonding properties are improved. Further, since one kind of adhesive is used, the assembling workability can be improved.

DETAILED DESCRIPTION

Figure 1:
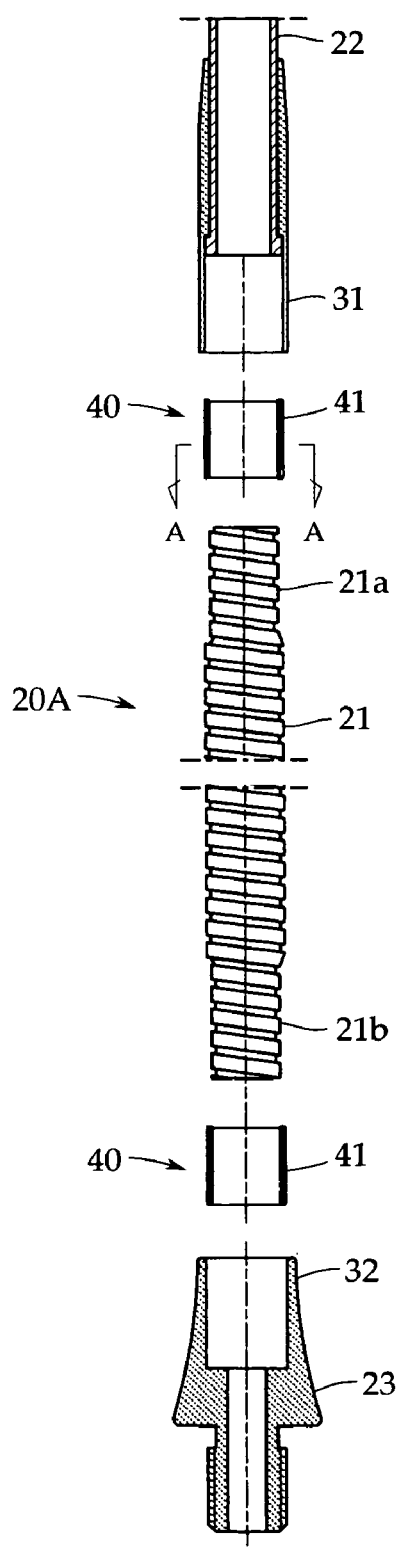
FIG. 1 is an exploded view showing an essential portion of a column provided in a microphone device in accordance with the present invention.

An embodiment of the present invention will now be described with reference to FIGS. 1 to 3. The present invention is not limited to this embodiment. In this embodiment, the same reference numerals are applied to elements that are the same or may be regarded as the same as those in the conventional example explained before with reference to FIG. 4.

FIG. 1 is an exploded view of a column 20A that a microphone device in accordance with the present invention has as an essential portion. In this example, the column 20A includes a flexible pipe 21, a support pipe 22, and a rotating pedestal 23. These elements are connected in the order of the support pipe 22, the flexible pipe 21, and the rotating pedestal 23 from the upside, but may be connected in the order of the flexible pipe 21, the support pipe 22, and the rotating pedestal 23.

Figure 4:
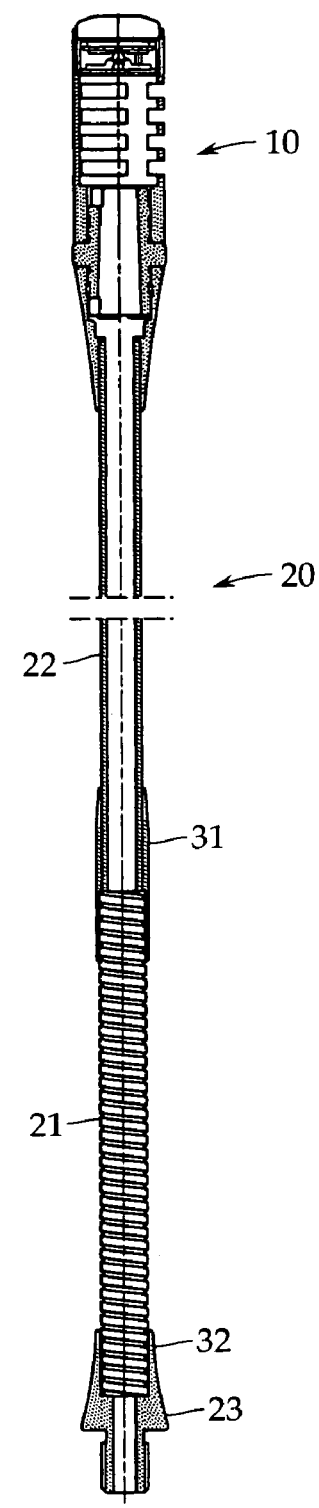
FIG. 4 is a sectional view showing the whole of a conventional gooseneck microphone device.

The flexible pipe 21 may be a commercially available one having the construction explained before in the conventional example. Although not shown in the figure, as mentioned before, a microphone unit 10 is mounted at the distal end of the support pipe 22 as shown in FIG. 4, and an electrical cable connected to the microphone unit 10 is inserted into the column 20A.

The flexible pipe 21 and the support pipe 22 are connected to each other via a sleeve-form connector 31, and the flexible pipe 21 and the rotating pedestal 23 are connected to each other via socket-form connector 32 formed in the rotating pedestal 23. In this example, the support pipe 22 and the connector 31 are connected integrally to each other by press fitting. In some cases, however, the connector 31 may be formed integrally with the support pipe 22.

The rotating pedestal 23 is supported on a base, not shown, fixed on a table so as to be rotatable around the vertical rotation axis. For the microphone device having no rotating pedestal 23, the socket-form connector 32 is provided on the base, and the lower end of the flexible pipe 21 is inserted into this connector 32.

The connectors 31 and 32 are formed so that the inside diameters thereof are larger than the diameters of the end portions of the flexible pipe 21. However, it is preferable that after the flexible pipe 21 is cut to a predetermined length, both ends 21a and 21b thereof be compressed by rolling to restrain an increase in diameter due to the looseness of winding.

In connecting the flexible pipe 21 to the support pipe 22 and the rotating pedestal 23 by inserting both of the ends 21a and 21b of the flexible pipe 21 into the connectors 31 and 32, in the present invention, a spacer 40 consisting of a metallic material having electric conductivity and spring-like elastic restoring force and an adhesive (elastic adhesive), not shown, which has elasticity even after being cured, are used.

In the example shown in FIG. 1, as the spacer 40, a spacer in which a mesh sheet 41 consisting of a metallic wire such as a stainless steel wire is formed into a cylindrical shape fitting on the end portion of the flexible pipe 21 is used. FIG. 2 is an enlarged sectional view of the mesh sheet 41 formed into this cylindrical shape, taken along the line A-A of FIG. 1. This mesh sheet 41 is installed at two places: at both ends 21a and 21b of the flexible pipe 21, and the constructions of the mesh sheets 41 may be the same.

Figure 2:
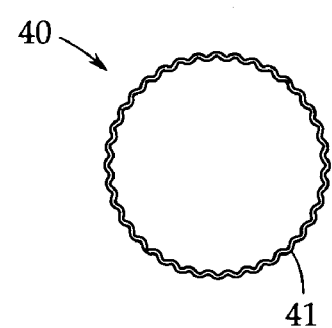
FIG. 2 is an enlarged sectional view taken along the line A-A of a spacer shown in FIG. 1.
Figure 3:
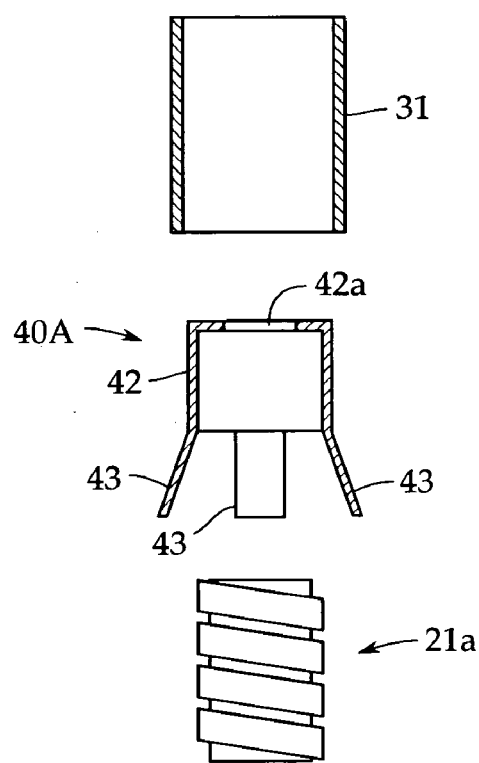
FIG. 3 is a sectional view showing a modification of the spacer shown in FIG. 1.

As shown in FIG. 2, the mesh sheet 41 is preferably provided with wavy irregularities, and by means of the irregularities, the mesh sheet 41 acts as a conductive spring between the end portions of the flexible pipe 21 and the connectors 31 and 32. The configuration may be such that the mesh sheet 41 is not formed into a cylindrical shape in advance, but is wound around the end portion of the flexible pipe 21 so as to be fitted in the connector 31, 32.

In any case, when the mesh sheet 41 is installed in the end portion 21a, 21b of the flexible pipe 21 and is fitted in the connector 31, 32, the above-described elastic adhesive is preferably applied to the mesh sheet 41.

According to this configuration, electrical continuity between the flexible pipe 21 and the connector 31, 32 (the support pipe 22, the rotating pedestal 23) is secured reliably via the mesh sheet 41, and the elastic adhesive is held on the mesh sheet 41, by which a shock mount having vibration absorbing properties is formed between the flexible pipe 21 and the connector 31, 32. Also, even if a gap between the flexible pipe 21 and the connector 31, 32 is wide to some extent, the continuity is secured by the mesh sheet 41.

Although the conductive resistance at the time when the conductive adhesive explained in the conventional example was used was about 10 Ω, the conductive resistance in the present invention in which the mesh sheet 41 was used was 3 Ω or lower. As the above-described elastic adhesive, for example, an elastic adhesive having a trade name of Super X, manufactured by Cemedine Co., Ltd., is commercially available. As the spacer 40, a flat metal sheet formed into a wavy shape may be used in place of the above-described mesh sheet 41.

Next, a modification of the spacer 40, which is embraced in the present invention, is explained with reference to FIG. 3. A spacer 40A in accordance with this modification is also installed at two places: at both ends 21a and 21b of the flexible pipe 21, and the constructions of the spacers 40A may be the same as in the case of the above-described mesh sheet 41. Therefore, only one spacer is explained herein.

The whole of the spacer 40A is formed of a plate spring material, and the spacer 40A includes a cylindrical cap portion 42 that is fitted on the outer periphery of the end portion 21a (21b) of the flexible pipe 21 and a contact segment 43 that is formed so as to spread toward the outside from the end portion of the cap portion 42 and comes into contact elastically with the inside surface of the connector 31 (32).

The cap portion 42 is formed with an insertion hole 42*a* through which the electrical cable is inserted. The cap portion 42 is preferably installed in the end portion 21*a* (21*b*) of the flexible pipe 21 by press fitting. The number of the contact segments 43 may be one, but preferably, a plurality of contact segments 43 should be provided at equal intervals.

According to this spacer 40A, the flexible pipe 21 in a state in which the cap portion 42 has been installed in the end portion 21*a* (21*b*) thereof is inserted into the connector 31 (32), by which the contact segment 43 comes surely into contact with the inside surface of the connector 31 (32) to provide the continuity.

Also, a shock mount effect that vibrations from the table, not shown, are damped is achieved by the elastic force of the contact segment 43. In this case as well, the elastic adhesive is preferably packed in the connecting portion to prevent foreign matters such as dirt from intruding.

The above is an explanation of the preferred embodiment of the present invention given with reference to the accompanying drawings. The present invention is not limited to this embodiment. Various changes and modifications that may be made in the scope of technical concept described in the following claims by those skilled in the art who are engaged in the field of microphone and have ordinary technical knowledge are naturally embraced in the technical scope of the present invention.

The invention claimed is:

1. A microphone device in which in a gooseneck microphone device, a column a part of which connects with a flexible pipe via a connector and the whole of which has a continuity and a microphone unit installed at the distal end of said column are included; said microphone unit is supported on an installation stand via said column; and an electrical cable connected to said microphone unit is inserted into said column, wherein an end portion of said flexible pipe is fitted in said connector via a spacer formed of a metallic material having electric conductivity and spring elastic restoring force, and said flexible pipe and said connector are bonded to each other by an elastic adhesive which has elasticity even after being cured.

2. The microphone device according to claim 1, wherein said spacer consists of a mesh sheet made of a metallic wire.

3. The microphone device according to claim 2, wherein said mesh sheet made of the metallic wire is formed into a cylindrical shape arranged along the outer periphery of the end portion of said flexible pipe.

4. The microphone device according to claim 3, wherein said mesh sheet made of the metallic wire, which is formed into said cylindrical shape, is provided with irregularities.

5. The microphone device according to claim 1, wherein said spacer is formed of a plate spring material, and includes a cylindrical cap portion which is fitted on the outer periphery of the end portion of said flexible pipe and a contact segment which is connectingly provided on one end side of said cap portion so as to come into contact elastically with the inside surface of said connector.

* * * * *